United States Patent [19]

Leva

[11] 4,277,425
[45] Jul. 7, 1981

[54] TOWER PACKING ELEMENT

[76] Inventor: Max Leva, 2160 Greentree Rd., Pittsburgh, Pa. 15220

[21] Appl. No.: 150,437

[22] Filed: May 16, 1980

Related U.S. Application Data

[60] Division of Ser. No. 887,604, Mar. 17, 1978, Pat. No. 4,203,934, which is a continuation-in-part of Ser. No. 749,272, Dec. 10, 1976, abandoned, which is a continuation of Ser. No. 586,529, Jun. 13, 1975, abandoned.

[51] Int. Cl.$^3$ .............................................. B01F 3/04
[52] U.S. Cl. ........................................ 261/98; 55/90; 202/158; 261/DIG. 72
[58] Field of Search ................. 261/79 A, 94–98, 261/112, DIG. 72; 210/150, 151; 202/158; 55/90

[56] References Cited

U.S. PATENT DOCUMENTS

| B 480,702 | 1/1976 | Lerner | 261/98 |
|---|---|---|---|
| 1,796,501 | 3/1931 | Berl | 261/94 |
| 2,602,651 | 7/1952 | Cannon | 261/DIG. 72 |
| 2,615,699 | 10/1952 | Dixon | 261/94 X |
| 2,921,776 | 1/1960 | Keeping | 261/DIG. 72 |
| 3,266,787 | 8/1966 | Eckert | 261/DIG. 72 |
| 3,311,356 | 3/1967 | Eckert | 261/DIG. 72 |
| 3,347,381 | 10/1967 | Minch et al. | 210/150 |
| 3,463,222 | 8/1969 | Grames | 261/112 X |
| 3,957,931 | 5/1976 | Ellis et al. | 261/98 |
| 3,965,225 | 6/1976 | Schinner | 261/79 A |

FOREIGN PATENT DOCUMENTS

| 853159 | 10/1952 | Fed. Rep. of Germany | 261/94 |
|---|---|---|---|
| 1029346 | 5/1958 | Fed. Rep. of Germany | 261/94 |
| 540647 | 7/1922 | France | 261/94 |
| 542902 | 8/1922 | France | 261/94 |

OTHER PUBLICATIONS

Norton, "Hy-Pak", Bulletin Hy-30, Norton Co., Akron, Ohio 44309, Copyright 1975, pp. 1, 2.

Primary Examiner—Richard L. Chiesa
Attorney, Agent, or Firm—Carothers and Carothers

[57] ABSTRACT

A randomly packed bed in a tower or column to prevent nesting of the packing elements and to improve physical stability and efficiency. Each packing element is a curved strip with one or more integral tabs or tongues depending downwardly from slots spaced longitudinally of the strips. Single or multiple rows and slots may be provided along the strip. Point-to-point contact between packing elements and substantially non-varying resistance to fluids flowing and improved mass transfer performance resulting from a more uniform packing density is assured.

12 Claims, 23 Drawing Figures

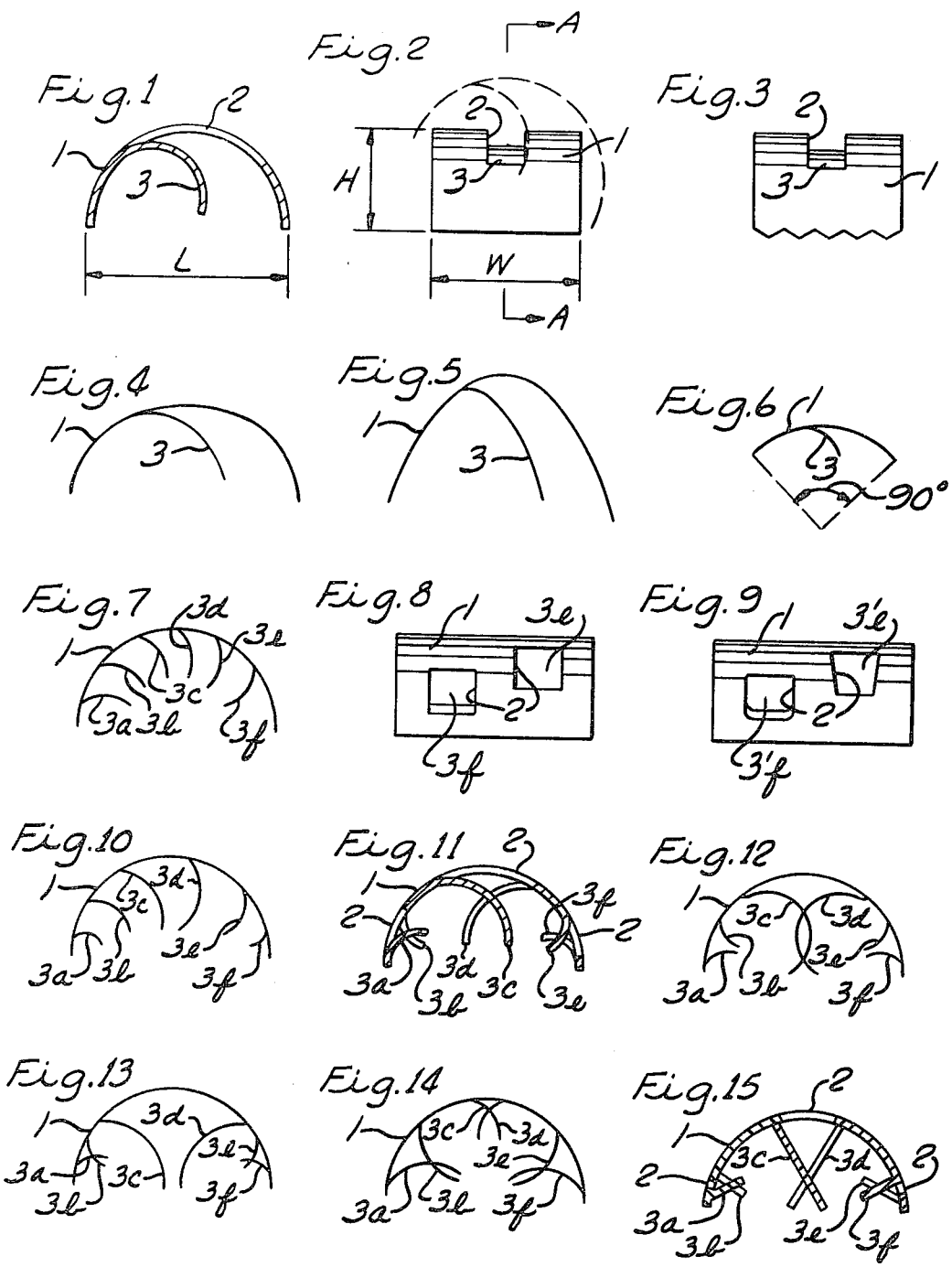

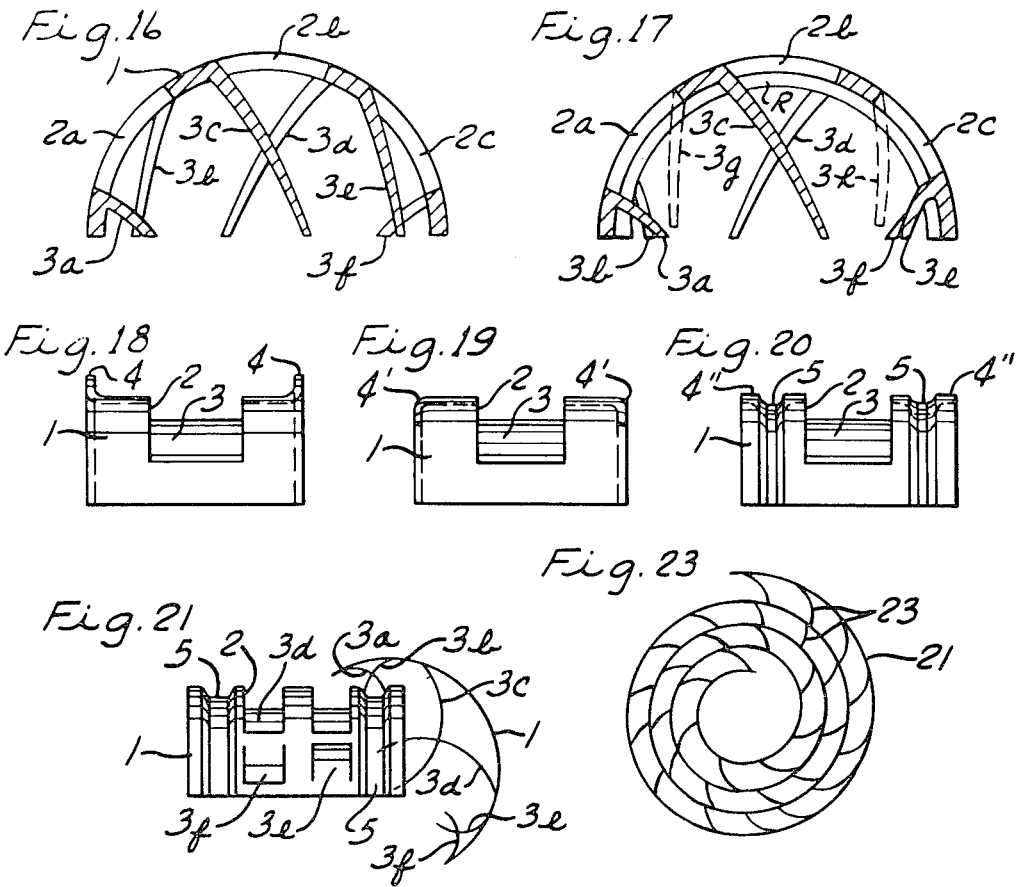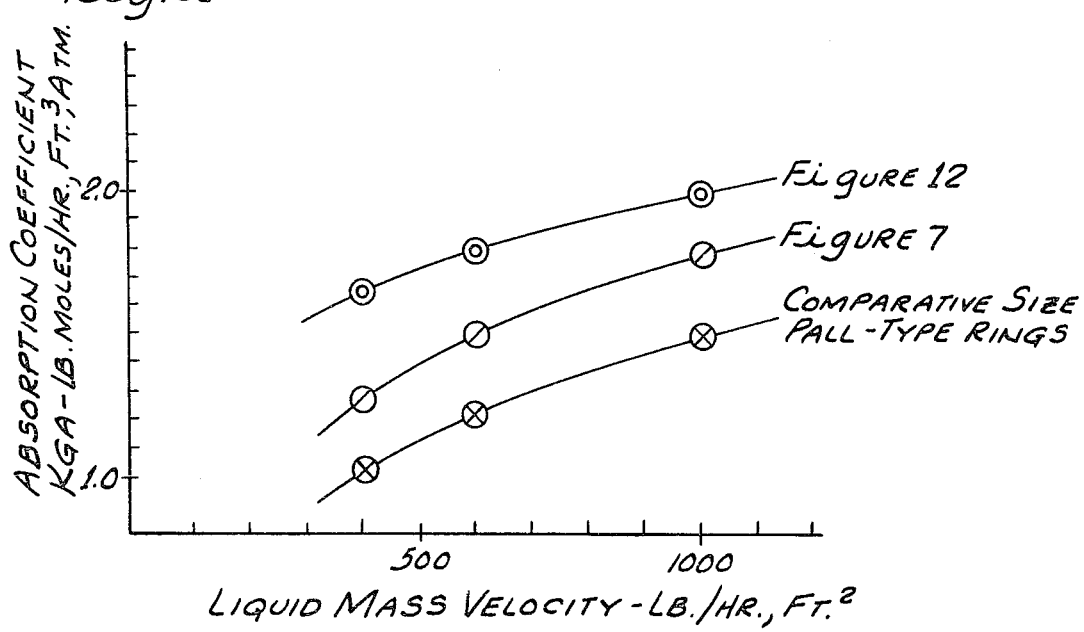

TOWER PACKING ELEMENT

CROSS REFERENCE TO RELATED APPLICATIONS

This application is a divisional of co-pending application Ser. No. 887,604 filed Mar. 17, 1978, which issued under U.S. Pat. No. 4,203,934 on May 20, 1980, which in turn is a continuation-in-part of co-pending application Ser. No. 749,272 filed Dec. 10, 1976, now abandoned, which is a continuation of application Ser. No. 586,529 filed June 13, 1975, now abandoned.

This invention relates to a novel tower packing for use in randomly poured packed beds in towers and columns, to bring about mass and heat transfer in gas absorptions, distillations, reactors and similar apparatus extensively used in chemical and physical operations.

The most commonly used packings for such purposes are various sizes of rings and saddles. Although widely used, these packings all suffer from the same shortcomings, namely, they will not really form truly physically stable packed beds. Thus, in the randomly poured beds composed of rings and saddles, the pieces are not truly individually interlocked, and will, therefore, with time, continue to shift and settle in the towers. This shortcoming has the obvious disadvantage that the flow resistance, which these beds will offer to the fluids that are passing through them, will steadily increase. Pressure drops and energy requirements for pumping are, therefore, very difficult to predict in advance for such packings with any great degree of assurance, because these quantities are forever changing.

Another severe shortcoming of the various ring and saddle packings is due to the fact that the beds formed by these packings, are not truly homogeneous in their texture.

With rings (such as Eckert U.S. Pat. No. 3,266,787 and Ellis et al U.S. Pat. No. 3,957,931), and other cylindrically shaped packing elements (such as Keeping U.S. Pat. No. 2,921,776, Cannon U.S. Pat. No. 2,602,651 FIGS. 5 and 6, and French Pat. No. 542,902), one always finds large numbers of the pieces aligned in tandem arrangement. This tandem arrangement is particularly objectionable because a channel is thus formed that is ideal for passing the liquids downwardly. Thus, the liquids are thereby often entirely separated from the gas phase that moves upwardly somewhere else. This separation of flows, which is virtually impossible to control and prevent, is one of the reasons why the contacting efficiencies of these packings are not accurately predictable. Furthermore, this separation of the phases results, in all instances, in a low contacting efficiency. With saddles (such as Berl U.S. Pat. No. 1,796,501) and/or open curved perforated strips (such as Cannon U.S. Pat. No. 2,602,651), the pieces tend to "nest", which is a generally accepted term with saddles, to indicate that the pieces will build up into stacks, the individual pieces fitting into each other snugly and preventing large portions of the packing surfaces to become accessible to the flowing liquid and gas phases. Obviously, nesting is, therefore, a major cause of poor contacting efficiency. Thus it is seen that the usual ring and saddle packings offer, in their randomly dumped beds, substantial regions of high and low local packing densities. As already stated, this undesirable situation leads to channeling of the liquids and hence to actual physical separations of the gas and liquid phases. The result is that these packings are much less effective to bring about heat and mass transfer between the liquid and gas or vapor phases than could be achieved if the packings would not encourage this phase separation.

In addition, perforated strip packing which has many small perforations and/or is provided with burrs or rough surfaces or edges (such as Cannon U.S. Pat. No. 2,602,651) impedes the easy and uninterrupted flow of liquid over the surface of the packing element. Such burrs and small perforations also prevent the packing from being drained readily of adhering liquid. This factor is important when the packing is to be used in quick succession for various services and when contaminations must be avoided as much as possible. Also, such rough edges, surfaces and burrs, and such multiple small perforations lead to accumulation and retention of impurities, a situation that is known as fouling, which must be avoided.

An object of this invention is to provide a novel tower packing which will overcome all the aforementioned shortcomings and which will eliminate entirely contaminations, foulings, the in-tandem arrangement of the pieces and nesting, and which will provide a homogeneous, stable packing.

Another object of the invention is to provide a novel method of manufacture thereof which is extremely simple.

Still another object is to provide a packing whereby more pieces may be packed into a unit volume than with comparable sizes of the various ring and saddle packings, whereby there is more surface area in a unit volume; and whereby virtually all the surface area of the packing is accessible to the liquid and gaseous phases, providing the packing with greatly superior mass transfer and heat transfer characteristics than comparable sizes of the various presently used ring and saddle packings.

Generally stated, the packing of the present invention is generated by cutting slots into thin strips or bands of materials, bending or striking out the resulting tabs or tongues downwardly from one side, and rolling the thus perforated band or strip into what is here described as an open-ended curved surface with the tabs protruding toward the inside. The material of which the packing is constructed may be any metal or plastic sheeting, clay or ceramic product or other that permits the formation of such a body by various means such as stamping or molding, for example.

In most cases, it will probably be most desirable that the construction material be of metal. Generally speaking, it will be satisfactory to curve the slotted band or strip into any open ended curved surface as, for instance, into the shape of a quarter- to a semi-circle, a quarter- to a semi-ellipse, parabola, hyperbola or along any other similar open-ended curve. However, for most practical applications, the new packing could be essentially composed of a semi-circle or near semi-circle. As far as the required number of slots and tongues extending therefrom are concerned, it is required that there be at least one such slot and tongue in every piece, so as to eliminate nesting and pattern packing. Obviously, however, the new packing may be endowed with more than one slot and tongue, for reasons that will be elaborated hereinafter. At least one of the tongues of each packing element should extend at least about one-fifth of the radius of the packing element into the center of the curved packing element to provide the aforesaid desired results, including interlocking, and to prevent nesting.

On the other hand, the tongues may be of such length that they extend essentially all the way into the center of the packing element or beyond.

Other objects and advantages appear in the following description and claims.

The accompanying drawings show, for the purpose of exemplification without limiting the invention or the claims thereto, certain practical embodiments illustrating the principles of this invention wherein:

FIG. 1 is a sectional front elevational view as seen along section line A—A of FIG. 2 of a packing element, embodying the present invention in the form of a semicircular strip.

FIG. 2 is a side view of FIG. 1.

FIG. 3 is a similar view as described in FIG. 2, but with the lower rims or edges of the packing element serrated.

FIG. 4 is a diagrammatic view which shows a modification of FIG. 1, portraying an elliptical curvature.

FIG. 5 is a diagrammatic view showing a further modification of FIG. 1 wherein the curved strip is in the form of a parabola. p FIG. 6 is a diagrammatic view showing a further modification of FIG. 1, covering a 90° arc.

FIG. 7 is a diagrammatic view illustrating a further modification of FIG. 1 employing a plurality of tongues.

FIG. 8 is a side view of FIG. 7, seen in the direction of the arrow.

FIG. 9 is a side view illustrating a further modification of the shapes of tongues that may be employed.

FIG. 10 is a diagrammatic view illustrating a further modification of FIG. 7, showing tongues of different lengths all embodied in one packing element.

FIG. 11 is a front elevational view in section of the packing element of the present invention showing a modification of FIG. 10.

FIG. 12 is a front diagrammatic view illustrating a further modification of FIG. 10.

FIG. 13 is a diagrammatic front elevational view showing a further modification of the packing elements displayed in FIGS. 11 and 12.

FIG. 14 diagrammatically exhibits a further modification of the packing element of the present invention, employing tongues of different lengths, all in one piece.

FIG. 15 shows a front view of a packing element of the present invention in section employing straight tongues.

FIG. 16 is an enlarged front view in section showing more detailed construction features of one embodiment of the invention.

FIG. 17 is a front view in section illustrating a modification of the packing element shown in FIG. 16.

FIG. 18 shows a side view of another embodiment of the packing element of the invention with upturned outer rims.

FIG. 19 is a similar presentation as FIG. 18, but with downturned outer edges.

FIG. 20 shows an end view of the invention encompassing peripheral grooves.

FIG. 21 shows a packing element of the type in FIG. 20 in typical conjunction with an attached packing element.

FIG. 22 is a graphic illustration showing typical gas absorption performance data observed with some preferred embodiments of the invention.

FIG. 23 diagrammatically shows a further modification of FIG. 1 involving a spirally wound strip for covering the entire area of the tower.

Generally stated, the packings of the present invention may be generated by cutting elongated slots into thin strips or bands of materials. If the material of construction is a metal, the thus resulting tabs or tongues are then most conveniently bent away from the slots and the entire strip with tongues extending is rolled into the shape of an open-ended curved surface, so that the struck-out tongues will point toward the inside of the curved surface. Of course, the packing elements may also be made of other materials such as ceramic clay products and plastics, just to name a few. With the choice of plastics, it may not always be convenient to form the elongated slots and resulting tongues in one integral operation as by molding, and in this situation, it may be more desirable to attach the required tongues to the narrow edges of slots or elsewhere on the strip body separately and by other means. Such molding or separate attachment permits packings that embody tongues of different lengths than the elongated slots from which they are depending, and further permits the tongues to depend from the curved strip at points other than from the edges of the slots.

FIG. 1 shows the packing embodying the present invention in frontal elevation as seen in section along line A—A of FIG. 2. The main body of the packing denoted by numeral 1 is forming a semi-circle, that is, it extends exactly through 180 degrees. The packing embodies one single slot 2, and one single tongue 3, depending therefrom.

Modifications of FIG. 1 are shown in FIGS. 4, 5 and 6, where the bodies of the packings 1 are in the form of a semi-ellipse, a parabola and a quarter-circle. Although only these three additional curved bodies are shown, various combinations thereof as well as other open-ended curves are conceivable within the spirit of the invention. As with FIG. 1, FIGS. 4, 5 and 6 show merely one single tongue. The slots, of course, also comprised by the packings are not indicated in these diagrammatic sketches.

A side view of FIG. 1 is given in FIG. 2. It will be noted that the body of the packing, denoted by numeral 1, consists with the exception of slot 2, of a continuous expanse of surface, which is smooth and without any secondary small perforations. Slot 2 is readily seen to have been generated by having struck tongue 3 out of the metal and bent downwardly, and it will be seen that no protruding ridges or burrs are lining the delineating edges of slot 2. This is important since it is generally to be avoided to have such burrs or rough edges, so as not to impede the easy and uninterrupted flow of liquid over the surface of the packing body. Such burrs and/or small perforations are further undesirable because they will prevent the packing from being drained readily of adhering liquid, a factor that is of importance when the packing is to be used in quick succession for various services and when contaminations must be minimized. Finally, rough edges, small perforations and burrs will lead to accumulation and retention of impurities, a situation that is known as fouling, and which must be avoided.

The surfaces of the tongues 3 are equally as devoid of obstructions as has already been emphasized for the bodies of the packings 1, and the object is to have as smooth and uninterrupted a surface as possible so as to encourage a high liquid carrying capacity.

As far as physical dimensions are concerned, the dimension between the ends of the curved strip in FIG. 1 has been denoted by L (for length). The height of the strip is H and its width is W.

For semi-circular as well as near semi-circular or semi-elliptical forms, L is about equal to two times H. Width W on the other hand is for best results about equal to L, or somewhat less. This will then facilitate the relatively close mutual approach of adjoining pieces, as is indicated in FIG. 2, by having shown by dashed line the closest position possible. It will be noted that with this particular choice of dimensions and length and curvature of the tongue, there is mutual interlocking, which could not be achieved if width W was substantially larger than length L. It is, of course, important to understand that by a carefully controlled amount of interlocking as brought about by the basic shapes of the invention and the proper dimensional parameters, optimum performance results may be obtained.

The preferred curvature of the curved strip is that corresponding to a near semi-circle. Hence, dimension L being in the case of a semi-circle a true diameter may be considered to determine the size of the packing. For application to the entire mass transfer field, it is envisioned that L should not generally be significantly less than 0.25 inch nor significantly more than about 6 inches. For most commercial gas absorption and distillation operations, the size of the new packing would normally be such that L should be between 1.0 and 4.0 inches. The other quantities H and W should be in relation to these limits as already stated.

FIG. 3 is another side view of FIG. 1 in which merely the depending edges or bottom legs have been serrated. Since for efficient operation and with smooth bodies 1 of the packings film flow of liquid is approached, a provision of serrations on the depending edges will cause an improved liquid transfer to adjacent and touching packed elements, and thus assist in improving the overall contacting efficiency in the tower.

The size and characteristics of the tongues and the number of tongues contained in a piece have been found to be important as far as performance efficiency is concerned. Generally speaking, the tongue dimensions will depend on overall size of the pieces. Thus, tongue widths may vary from as small as ⅛ inch for the smallest pieces up to one inch or larger for the largest packings. Preferred widths have been found to vary from 0.25 to 0.75 inch.

Whereas in FIGS. 1 through 6 the basic feature of the invention has been characterized by providing one single tongue per piece, in practice it has been found desirable to equip each piece with a plurality of tongues. Thus, FIG. 7 shows a design in which a total of six tongues, designated by numerals 3a to 3f are contained. It will be noted that these tongues are all of the same length, extending about halfway into the center of the packing. This particular design has been carefully tested in gas absorption performance and found to be considerably superior to conventional packings, as will be discussed later.

FIG. 8, being a view of FIG. 7 in the direction of the arrow, indicates that the six tongues are actually contained in two separate rows, with each row providing three tongues proceeding in the same direction.

FIG. 9 is a modification of FIG. 8 in that the slots and tongues are shown to have rounded lower edges (3′f), and where the slots and tongues have a slight downward taper (3′e). Pressing and stamping experience has shown that with these modifications, improved workmanship is obtained.

Whereas it is noted that in FIG. 7 all tongues 3a to 3f in the element are of the same length, it has, entirely surprisingly, been found that a very significant improvement in mass transfer efficiency will result if the tongues contained in any one element are of different lengths and are arranged in the element in a certain order. Thus, FIG. 10 shows an element where six tongues of various lengths, all proceeding in one direction, have been provided in such an order that the tongues immediately adjacent to the starting edge, namely numbers 3a and 3f, are smallest and extend only about one-quarter distance into the center (c) of the element. Tongues 3b and 3e are longer, extending about halfway into the center (c), and the two central tongues, 3c and 3d, extending to within about ⅝ to ¾ into the center (c) of the element. At least one of the tongues should extend at least about 1/5 the way into the center.

FIG. 11 shows a modification of design of FIG. 10, again six tongues in the same element, but proceeding alternately in opposite directions. Furthermore, it will be noted that the lengths of the tongues is in accord with the length of their respective slots. Hence, this element has been generated by actually having struck the tongues out of the metal and thereby have formed the respective slot.

FIG. 12 shows another modification of the design of FIG. 11, with the central large tongues actually crossing twice and the shorter peripheral tongues merely approaching one another.

A further variation of this design is shown in FIG. 13 with the central tongues proceeding toward each other, but stopping short of crossing each other, and the smaller peripheral tongues crossing each other. Whereas in FIGS. 11, 12 and 13, packings are shown in which the small tongues are on the extremes of the element, and the longer tongues are in the center, a design is shown in FIG. 14 where the opposite is the case. Thus, in FIG. 14, tongues 3a and 3b as well as 3e and 3f are the long tongues, extending very closely toward the center (c), whereas centrally depending tongues 3c and 3d are shorter and extend only to within about one-third of center (c).

Having examined the packings so far discussed for pressure drop behavior and having found them to deviate relatively little from each other, the design shown in FIG. 12 was investigated in considerable detail in gas absorption. The experimental tower was of 14 inches diameter and carried five feet of the packing. The absorption involved the removal of $CO_2$ from air, by using a four percent solution of NAOH in water. Also tested in the same equipment was a packing made in accordance with the design of FIG. 7, as well as a bed of 1½ inch pall-type rings, which size is most nearly corresponding to the sizes of the new packings tested.

All packings were made of carbon steel and were subjected to a gas mass velocity of 500 lb./hr.ft.$^2$, and liquid mass velocities ranging from 400 to 1000 lb./hr.ft.$^2$. As is customary, the absorption performance was reported in terms of the so-called absorption coefficient $K_Ga$, expressed as lb-moles/hr.ft.$^3$ atm, and shown in relation to the liqud irrigation rate. The resulting graph is shown in FIG. 22.

Considering first the improvement that results when the new packing designed in accordance with FIG. 7 is compared with the pall-type rings, there results the data shown in Table 1.

TABLE 1

Comparison of Packing According to Design of FIG. 7 with Pall-type Rings.

| Liquid Mass Velocity | Packing FIG. 7 | Pall-type Rings | Improvement (percent) |
| --- | --- | --- | --- |
| 400 | 1.27 | 1.04 | 22.1 |
| 600 | 1.50 | 1.22 | 22.9 |
| 1000 | 1.76 | 1.48 | 18.0 |

Considering now the improvement of design FIG. 12 over the pall-type rings and the design of FIG. 7, this is reported in Table 2 below.

TABLE 2

Comparison of Packing According to Design of FIG. 12 with Design of FIG. 7 and Pall-type Rings

| Liquid Mass Velocity | Packing FIG. 12 | Packing FIG. 7 | Pall-type Rings | Improvements Packing FIG. 12 over FIG. 7 | (percent) Packing FIG. 12 over Pall-type Rings |
| --- | --- | --- | --- | --- | --- |
| 400 | 1.63 | 1.27 | 1.04 | 28.3 | 56.6 |
| 600 | 1.79 | 1.50 | 1.22 | 19.3 | 46.5 |
| 1000 | 2.00 | 1.76 | 1.48 | 13.6 | 35.0 |

From Table 1 it appears that the design of FIG. 7, embodying tongues of the same length alone, offers a significant average improvement of about 20 percent over the corresponding size of pall-type rings. By having equipped the packing with tongues of unequal length, and being at various distances away from the center, and arranged at a certain pattern, an additional improvement of some 20 percent over the design of FIG. 7 has been achieved, and an average improvement of about 46 percent over the corresponding size pall-type rings. These data demonstrate clearly the significant improvement that is obtained with the choice of arrangement of unequal tongues, terminating at various distances from the center of the packing.

Whereas in all packings discussed so far, a total of six tongues was shown, it is entirely in order to have a considerably larger number of tongues than only six. Thus, with the larger sizes of packings that may be employed in industry, it would be customary to have more than two rows of tongues in any one piece. Thus, if there would be, as is shown in FIGS. 11 to 14 so far discussed, three tongues in any one row, any packing that would employ as many as three, four or five rows of tongues would have a total of 9, 12 or 15 tongues in all. Of course, it is conceivable that perhaps fewer or more than three tongues could be in any one row, and each row would not necessarily have to contain the same number of tongues as the next. Furthermore, there may be cases where there are some slots by themselves, without a depending tongue, or there may even be occasional tongues depending from the body of the packing without the slot. Hence, it is seen that the total number of tongues in a piece may vary considerably. However, broadly speaking, it is the rule that the larger pieces will be equipped with the greater number of tongues in order to achieve the best performance efficiencies.

Another modification of the packing of the present invention is shown in FIG. 15. It shows the short tongues on the extremes of the packing and the larger tongues, depending downward toward the center. Furthermore, it will be seen that the tongues are either longer or shorter than the relative slots from which they depend. All tongues are straight. This embodiment of the invention would not be easily made of metal, and would lend itself more readily to manufacture from plastics or similar materials, such as in a molding process.

Another embodiment of the invention preferably made or molded of plastic is shown in FIG. 16 in greater detail. In this embodiment, the tongues 3a to 3f extend from the material 1 in a fashion similar to that illustrated in FIGS. 11 to 15. Tongues 3a and 3f are shorter than the remaining tongues. Also, it should be noted in this embodiment that tongues 3a and 3f are shorter than the corresponding slots 2a and 2c from which they depend, while tongue 3c (and for that matter the other remaining long tongues) is longer than the corresponding slot 2b from which it depends.

Another modification of FIG. 16, also preferably made of plastic, is shown in detail in FIG. 17. In all six tongues 3a through 3f are shown. The small tongues 3a and 3b as well as 3e and 3f are at the extremes of the element, whereas the large tongues 3c and 3d extend downwardly from the center. It will also be noted that the tongues may either be shorter or longer than the slots from which they depend. The thickness of the tongues does not have to be uniform all the way through their length. Thus, it has been found desirable for reasons of manufacture and others to have the thicknesses of the tongues becoming less as their tips are approached. This tapering out is clearly shown in tongues 3c and 3d.

As will be seen, the packing possesses also a central reinforcing rib (R). Whereas in the packing tongues are only shown as extending from one single end of a slot, it is entirely conceivable to have tongues also extend from both ends of a slot. This is indicated by dashed tongues 3g and 3h, extending from the upper edges of slots 2a and 2c respectively.

It has been taught that the tongues may extend to within varying distances of the center of the element. However, in order to obtain the best efficiency in mass transfer, preclude nesting and give excellent internal liquid distribution, it has been found that it is preferable to have the tongues (or at least one of the tongues) generally extend toward the center of the piece through a distance of at least one-fifth of the radius of the packing element. As far as the longer tongues are concerned, these will generally extend to near the center of the pieces, but may even go beyond. The individually corresponding tongues may approach each other, cross once or even twice, as shown in FIGS. 11, 12 and 13.

The widths of the tongues is another important design variable, which will depend largely on the sizes of the packings and the purposes to be achieved. Broadly, the widths of the tongues may be expressed in relation to the width W of the pieces themselves. With comparatively large pieces where many rows of tongues are employed, the ratio of width of the packing to width of the tongue may approach a value of 10, whereas, for the smallest conceivable pieces, a width ratio of 2 or less may be practical.

FIG. 18 shows a packing element generally in accordance with the design of FIG. 2, but with the outer rims of the body of the packing 4 turned upward.

FIG. 19 shows a similar element where the outer rims 4' have been turned downwardly.

FIG. 20 shows a packing element for which the outer rims 4" have been modified to provide a circumferential inwardly extending groove 5.

These modifications of the outer rims of the packings will not only be instrumental to improve the individual strength of the pieces and thus permit the employment of very thin sheet material for their construction, and hence, material savings, but these modifications will also encourage the further mutual interlocking of the pieces, and assist with the creation of a packed bed that will not be prone to shift and settle. This particular feature is exemplified by FIG. 21, where it is clearly seen how neighboring pieces may take advantage of this for interlocking.

FIG. 23 shows a further modification wherein a continuous strip 21 having tongues or tabs 23 similar to tongues 3 in FIGS. 1 or 7 with either a single row or a double row as shown in FIGS. 7 and 8. By providing a continuous strip with many rows of tongues and winding it into a spiral until it occupies the entire area within the tower, and it is thus possible to provide a very uniform distribution of openings. The provision of openings and the tongues depending therefrom in touch with the next neighboring packing surface is the important feature in this construction, since the irrigating liquid will run along the tongues and through the slots laterally. Thus through the dual function of slots and depending tongues which are in touch at their tips with the next neighboring packing surface, a lateral liquid distribution is encouraged which is most desirable for improved wetting of the packing and better mass transfer. Obviously, this lateral flow pattern of liquid could not result if there were only tongues and no slots, or if the free ends of the tongues would not touch the next neighboring packing surface. Of course, other arrangements for striking out tabs or tongues from the strip, such as shown in FIGS. 9 to 14, inclusive, may be used instead.

Thus it will be seen from the modifications described, that they will yield a stable and non-shifting packed bed and there will be no nesting. Thus, they will assure operational stability that may not be obtained with any other of the conventional packing elements. Furthermore, it has been found that in randomly dumped beds of the new packing, there are a vastly greater number of point-to-point contacts between adjacent and near-adjacent packing elements. This greater number of bodily contacts within the dumped beds will greatly assist in the coordinated direction of the irrigating liquid downward through the packed bed, thereby yielding better utilization of the physical contact area provided by the bed and thereby increasing the efficiency of function of the beds in an important measure.

I claim:

1. In a packing for a vapor- or gas-liquid contact tower and the like, a plurality of randomly packed, mutually interlocking packing elements providing a bed having substantial physical stability, each packing element comprising an open-ended curved strip being molded of plastic exhibiting curvature only in a single direction and the curvature extending through an angular range of about 90 to 180 degrees, said strip having a plurality of tongues, being molded of plastic, selected ones of which are different lengths and extending only inwardly of the curvature of said strip, at least one slot extending along said single direction in said curved strip, the surface of said strip and tongues being otherwise smooth and free of small perforations, at least one of said tongues extending for at least a distance equal to about one-fifth the distance from its base at the concave surface of said strip to the center between the ends of said strip, so as to permit interlocking with and prevent nesting with adjacent packing elements and provide a homogeneous packing.

2. In a tower packing as recited in claim 1, wherein said tongue depends from one end of said slot, and said tongue is of a length different than the length of said slot.

3. In a tower packing as recited in claim 1, wherein the extreme corners of said tongue are rounded.

4. In a tower packing as recited in claim 1, wherein said tongue is tapered in width.

5. In a tower packing as recited in claim 1, wherein said tongue is tapered in thickness.

6. In a tower packing as recited in claim 1, wherein said tongue is straight.

7. In a tower packing as recited in claim 1, wherein two of said tongues extend from the opposite ends of the same slot.

8. In a tower packing as recited in claim 1, wherein the ends of said strips are serrated.

9. In a tower packing as recited in claim 1, wherein the circumferential edges of said strip are upturned.

10. In a tower packing as recited in claim 1, wherein the circumferential edges of said strip are rounded.

11. In a tower packing as recited in claim 1, wherein circumferential grooves are provided along the circumferential edges of said strip.

12. In a tower packing as recited in claim 1, wherein the width of said curved strip is less than or equal to the length of said curved strip.

* * * * *